Patented May 4, 1926.

1,583,521

UNITED STATES PATENT OFFICE.

CARL WILLIAM BOYNTON, OF PHILADELPHIA, PENNSYLVANIA, ASSIGNOR, BY MESNE ASSIGNMENTS, TO THE GOVERNMENT OF THE UNITED STATES AND TO THE PEOPLE OF THE UNITED STATES.

PROCESS OF MAKING VESICULAR PRODUCTS.

No Drawing.     Application filed December 20, 1918. Serial No. 267,710.

(GRANTED UNDER THE ACT OF MARCH 3, 1883; 22 STAT. L. 625.)

*To all whom it may concern:*

Be it known that I, CARL WILLIAM BOYNTON, a citizen of the United States, residing at Philadelphia, in the county of Philadelphia and State of Pennsylvania, have invented certain new and useful Improvements in Processes of Making Vesicular Products; and I hereby declare that the following is a full, clear, and exact description thereof.

This application is made under the act of March 3, 1883; chapter 143; U. S. Stat. XXII, p. 625. The invention may be used by the Government of the United States, or by any of its officers or employees in the prosecution of work for the Government, or by any other person in the United States, without payment to me of any royalty thereon.

This invention is a novel process of or method for producing from suitable earthy materials, such as clay or shale, a vesicular product which possesses the following characteristics, to wit: it is of low apparent specific gravity; is light in weight compared with a similar body of clay or shale; is strong, tough and durable; is not a conductor of heat; is a good insulator of electricity; is non-absorbent; is substantially impervious to water under ordinary conditions; is substantially homogeneous and uniformly vesicular; is of a texture indicating a fused or softened condition during the formation thereof. The vesicular or cellular appearance of the product indicates the formation and expansion of gases in the fused or softened mass during the formation of the product, such gases being evolved from compounds existing in or incorporated with the earthy materials from which the product is formed. The said vesicular product when crushed or broken appears free from laminations, striations and flat or shale-like particles, indicating planes of cleavage or weakness; and is substantially homogeneous throughout.

The product may be used for various purposes, such as a non-conductor of heat, an insulator for electricity, roofing, slabs, and tile; and also, when crushed, or properly prepared and sized, as an aggregate for use in the manufacture of concrete and as such is peculiarly well adapted to the construction of reinforced concrete ships, floors, roofs; and in various other constructions where strength and lightness are desirable; and it may be made up in commercial forms for various other objects.

I will explain the process of producing such vesicular product in accordance with the present invention, to enable others to understand and use the same, but it is to be understood that various modifications may be made in the process within the scope of the invention as may be found necessary and convenient in the practice of the invention on different or varying clays and shales or like composition of earthy materials.

The earthy material usually operated upon is clay or shale, preferably rich in compounds of metallic oxides, carbon, sulphur, sodium, potassium, or other equivalent compounds, some of which when the material is subjected to heat will either act as a flux in reducing the more refractory compounds, or will give off gas, at the desired time, or both. The use of clay or shale or earthy materials containing a relatively high percentage of calcium carbonate or magnesium carbonate should be avoided, as such undesirable elements, after being subjected to a temperature sufficiently high to change their form, would be detrimental to the product.

An example of a shale that has been successfully treated by the process to produce a product having the characteristics specified is the so-called Birmingham shale common in the Birmingham, Alabama, district.

As an example of clays, clay found near Santa Monica, California, has been successfully treated by the process.

The particular shale and clay mentioned above are merely cited as examples of natural shales and clays which have been already successfully used, and their constituents indicate the general nature of the earthy materials or compounds that can be successfully treated by the process.

Metallic oxides, carbon, sulphur, sodium, potassium, or other gas evolving and fluxing compounds should preferably be present in the clay or shale in sufficient quantity and in proportions which will cause the material to reach an incipient fused condition coincident with or previous to the evolving of gases. However, if for economic or other reasons it is desirable to use a given clay or shale which, as it occurs in nature, is not of proper composition, such defect may be corrected by additions or subtractions, as the case may require.

As stated, the earthy material, clay or shale, should be rich in carbon, sulphur or other elements, alone or in composition, which, when subjected to the proper temperature, will cause the production of gas. Iron is a desirable element, for it possesses a powerful action as a flux and facilitates the desired degree of softening of the mass, as well as produces gases in the transformation from higher to lower oxygen compounds. However, excessive percentages of this element in the materials treated should be avoided, for if it is present in too large a proportion it will tend to make the product heavy. Sodium and potassium compounds are also desirable fluxes.

The ratio of the fluxing constituent or constituents to the non-fluxing constituent or constituents of the earthy material, clay or shale, can vary within wide limits. The ratios indicating fusibility at comparatively low temperature may be commercially preferable.

In carrying out the process the first essential step thereof is to reduce the earthy material, shale or clay, by any suitable means (such as a disintegrator, mixer or other type of grinding or reducing machine) to a fineness capable of passing through a screen having six or more meshes to the linear inch. The reduced fine material, if not immediately subjected to further treatment, may be stored in suitable bins until it is desired for use. If desired, the reduced material may be mixed with water and thoroughly tempered to provide a uniform plastic mass before further treatment. Instead of reducing the earthy material, clay or shale, to a plastic mass it may be reduced to a slurry by mixing the clay or shale with sufficient water to cause it to flow.

The reduced material may, if desired, be moulded or formed by any suitable machine into any desired form and size; according to the use for which the resultant product is to be employed; or as may best suit it for treatment in the kiln or furnace in which such prepared material is to be next treated to convert it into a vesicular product.

In some instances if the material is formed into shapes or expressed in a moist condition it may be preferable to pre-heat or dry out the formed material before introducing it into the kiln or furnace. Such drying, however, need not be carried as far as it is practiced in the manufacture of common brick.

If the kiln or furnace employed is provided with a pre-heating chamber of sufficient length, the forms of the prepared material may be placed, without drying, directly in the kiln or furnace. The time and extent of drying being suited to the pre-heating arrangement of the kiln.

It is desirable to heat the prepared material as rapidly as possible without rupturing the mass or shape of the material, to a temperature which will render the mass soft and plastic, or bring it to a state of incipient fusion, and produce within the plastic mass gases, generated from some constituents in the prepared material, which gases are evolved practically uniformly throughout the plastic mass, causing it to swell and expand in bulk, the gases remaining principally or wholly confined therein, but so uniformly distributed therethrough that the mass becomes vesicular, full of small cells. The proper temperature is reached when the material expands and is converted into a vesicular mass, the action of the confined gases therein being approximately like the action of the confined gases on leavened wheat dough in the cooking thereof. And when the expanded mass is cooled it results in a vesicular product of the nature and having the characteristics above set forth.

The preferred resultant vesicular product is low in calcium content, and also in magnesium content, so that it will not be subject to deterioration by reason thereof even when exposed to sea water.

The material should be brought to a temperature which produces in the material an incipient fused condition; that is, a condition which will permit of the material being changed in form and uniformly expanded by pressure of the gases evolved therein, resulting from the change in form of compounds in the material under the influence of heat. The heating should be accomplished without cracking, popping or otherwise permitting the violent escape of gases from the incipiently fused material, thus producing a vesicular product substantially uniformly full of small cells and free from large cavities or dense portions, and so remaining when cooled.

In all cases where it is necessary to subject the prepared material to a temperature and for a period of time sufficient to swell it without seriously cracking or otherwise destroying the general form thereof, if it was previously shaped. Some clays and shales treated by the process begin to fuse and swell at about 1,040 to 1,060 degrees centigrade; while others do not begin to swell until a temperature considerably higher is reached.

The time and temperature required to bring about the desired swelling action varies with the earthy material used, and with the type of kiln or furnace used. In some cases where the prepared material is dried before burning it can be gradually raised to the temperature required to produce swelling in about two hours.

It can be readily appreciated that the period of time and the gradual raising of the temperature during the period of time to which the material is subjected depends on the material treated, the nature of the preliminary treatment thereof, the extent of pre-heating or drying of such prepared material, the size of the formed bodies of material to be treated, and the kind or type of kiln or furnace employed.

After the prepared material has been brought to the maximum heat required and maintained at that temperature for the proper length of time, it is preferably gradually cooled in any suitable way, as by passing it from the hot zone in the kiln or furnace into a zone or chamber in which the temperature is gradually reduced as the material moves forward toward the exit of the kiln.

To produce the desired vesicular product, according to the present invention, the degree of heat required and the length of treatment of the material will vary somewhat, according to the different composition of the earthy materials used; the type of kiln or furnace employed; the size and shapes of the formed bodies, the fuel employed, and various other incidental conditions commonly arising in practically performing the process.

Any suitable means for heating the material may be employed. For instance, a continuous kiln or furnace may be used, such furnace having a conveyor for supporting the material in the shapes in which it has been prepared and carrying the formed shapes through the kiln in a direction opposite to that of the draft of burning gases, if such kiln or furnace is one in which a draft is created. Various other kinds of kilns or furnaces, such as are used in the burning of clay products, and in the manufacture of pottery, etc., in which the material is heated by direct firing or by indirect firing, may be used.

The prepared raw clay or shale may also be converted to a vesicular mass by passing the fine dry material through a proper kiln or furnace. The ordinary type of rotary kiln used in the cement industry is suitable for treating the raw material either in the dry or slurry condition. The period of time required to convert the raw material, when in a dry or slurry form, to a vesicular mass in such a kiln will depend upon the material and the length and diameter of the kiln employed.

As above stated, the material may be reduced to a desired fineness, then formed into a plastic mass, then shaped to desired convenient forms for subsequent treatment, and then burnt to produce the vesiculated product; or the material may be reduced to a slurry and treated directly in a suitable kiln to dry and burn it to produce the desired vesiculated product; or the material may be reduced to the desired fineness and introduced in a dry condition into a kiln or furnace and burnt to produce the desired vesiculated product.

In whichever way the material is initially prepared, if the process is properly carried out thereon, the resultant product will have the characteristics above pointed out.

In carrying out the process care should be taken not to heat or burn the product to such an extent that it loses its strength and toughness and becomes weak and brittle.

The process described converts the earthy material, clay or shale, into a strong, tough, durable homogeneous product that is substantially uniformly vesicular, full of small cells throughout; and it lowers the apparent specific gravity of the clay or shale in some instances to less than one, a degree found consistent with strength and toughness.

If the rate of heating is very slow, the gases formed in the mass may not be produced in sufficient volume, or afforded time and opportunity to escape, which would result in a less degree of swelling.

When the product is to be employed as an aggregate in the manufacture of concrete or the like, it is desirable to avoid oxidization, as the oxidized portion which is solidified naturally increases the weight of the product. However, as superficial or external oxidization cannot be entirely avoided in some types of kilns or furnaces, and as the value of the product is not destroyed for the purpose of the invention by merely superficial oxidization, such superficially oxidized material may be used in some cases with economy, particularly where the material is only slightly oxidized.

If the vesicular product is to be used for insulation it may be found in some cases preferable to have a product entirely vesicular in structure, and in other instances to have a light oxidized shell or surface portion on the product.

In some cases where the product is produced in the particular form or shape in which it is intended to be used, oxidization will not be objectionable, even if carried to such an extent as would not be desirable if the product were to be used as an aggregate for concrete.

What I claim is:

1. The process of making a vesicular product, consisting in reducing suitable earthy material containing compounds capable of generating gases to a slurry, and burning the slurry to a vesicular condition.

2. The process of making a vesicular product, consisting in grinding suitable earthy material containing compounds capable of generating gases, reducing the ground material to a slurry, and burning the slurry to a vesicular condition.

3. The process of making a vesicular product, consisting in reducing suitable clay or shale containing compounds capable of generating gases to a slurry, and burning said slurry in a kiln or furnace until it is converted to a vesicular condition, and then cooling it.

4. The method of making light weight mineral aggregate, which comprises subjecting argillaceous material progressively to the action of heated gases, then heating said material so that it will expand, and then cooling the same.

5. The method of making light weight mineral aggregate, which comprises subjecting to heated gases argillaceous mineral material containing iron compounds equivalent to more than 5% by weight of oxide of iron, increasing the heating of said material by direct contact with a flame of sufficient intensity to produce incipient fusion, and then cooling the same.

6. The method of making light weight mineral aggregate, which comprises subjecting crushed argillaceous mineral material progressively to the action of heated gases, then heating said material so that it will expand and nodulize and then cooling the same.

7. The method of making light weight mineral aggregate, which comprises subjecting argillaceous material progressively to the action of heated gases of progressively increasing temperature until the said material expands and nodulizes, and then cooling the expanded material.

8. The process of producing from clay or shale a vesicular aggregate free from laminations or planes of cleavage, consisting in finely reducing the clay, mixing it with water and forming small clay bodies, then heating said bodies until they expand and nodulize, and then cooling the same.

9. The process of producing from clays or shales containing iron, a vesicular material free from laminations or planes of cleavage, consisting in disintegrating or pulverizing such clay or shales, mixing therewith enough water to produce a plastic mass, forming such mass into small bodies; and then heating said bodies until they expand and nodulize, and then cooling the same.

In testimony that I claim the foregoing as my own, I affix my signature.

CARL WILLIAM BOYNTON.